July 5, 1927.
J. L. BREESE, JR
1,634,533
PROCESS OF COMBUSTION
Filed Jan. 5, 1924
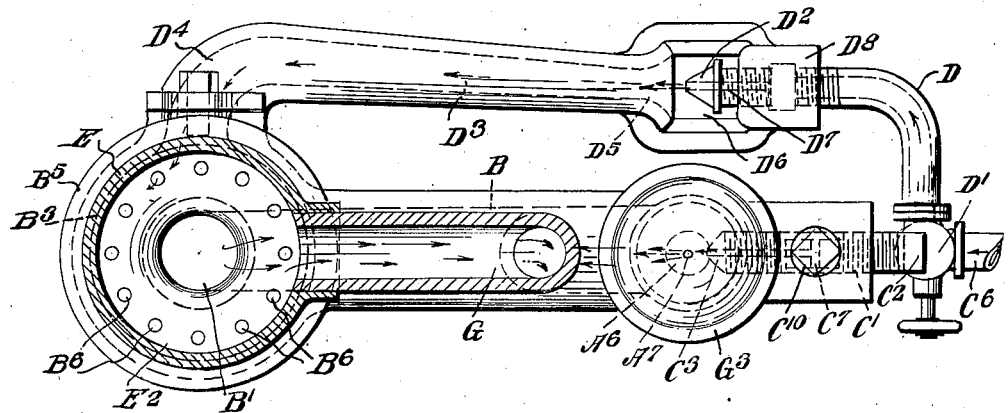
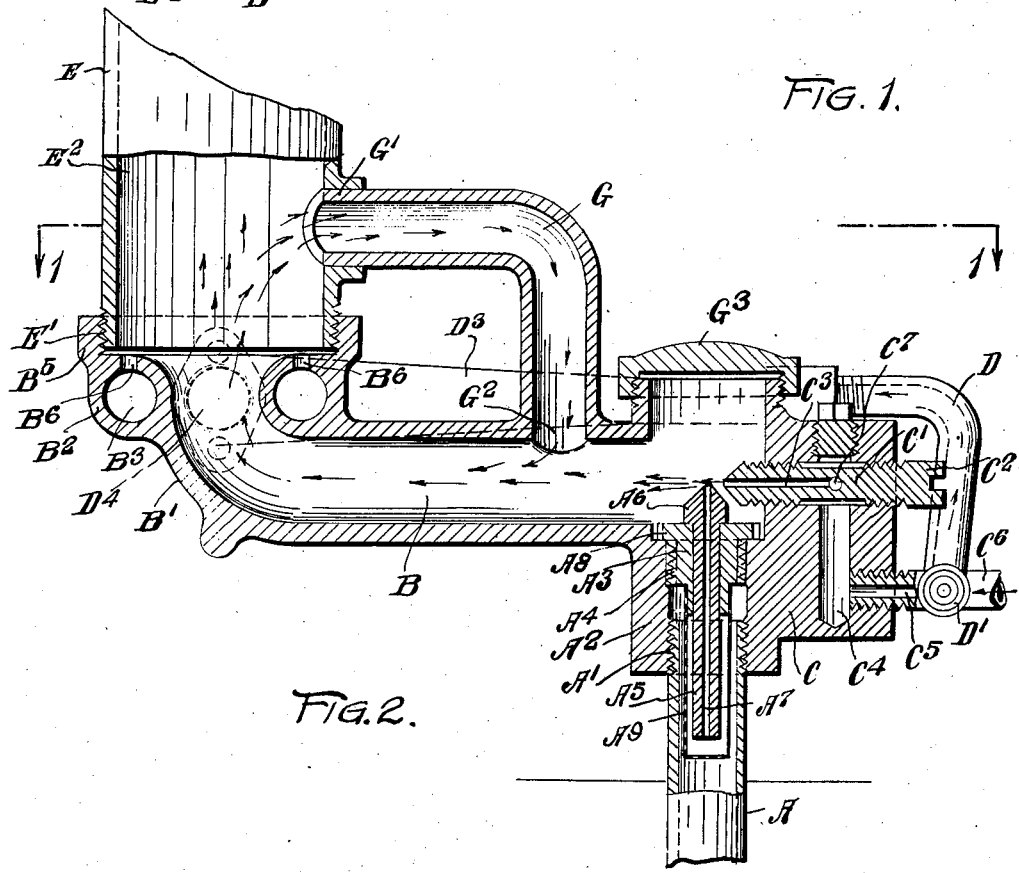
FIG. 1.
FIG. 2.
INVENTOR
James L. Breese Jr.
By
ATTORNEY Patented July 5, 1927.

1,634,533

UNITED STATES PATENT OFFICE.

JAMES L. BREESE, JR., OF CHICAGO, ILLINOIS, ASSIGNOR TO OIL DEVICES CORPORATION, OF CHICAGO, ILLINOIS, A CORPORATION OF ILLINOIS.

PROCESS OF COMBUSTION.

Application filed January 5, 1924. Serial No. 684,523.

My invention relates to a process of preparing and burning hydrocarbon fuels, and is particularly adapted to, though not limited to mixing such fuels for combustion and burning them as steps of a single process. It has for one object the prevention of precombustion. Another object is the prevention or reduction of the noise normally caused by precombustion and by combustion. Another object is the utilization of the waste gases of combustion to heat the incoming hydrocarbon. Another object is the utilization of the waste gases of combustion as an inert mixing and carrying medium for the incoming hydrocarbon, to prevent precombustion. Other objects will appear from time to time in the course of the specification and claims.

I illustrate my invention more or less diagrammatically in the accompanying drawings wherein:

Figure 1 is a plan view of the structure used, with parts shown in section along the line 1—1 of Figure 2; and Figure 2 is a vertical longitudinal section.

Like parts are indicated by like symbols throughout the specification and drawings.

Referring to the drawings A is any suitable oil or other fuel inlet pipe, screw threaded as at $A^1$ into the boss $A^2$. $A^3$ is a plug screw threaded into the boss $A^2$ as at $A^4$ and carrying an apertured passage member $A^5$ terminating in a fuel jet $A^6$ having a conic top, with the central passage $A^7$ penetrating the apex of the cone. $A^8$ is a pinion or other suitable member whereby the plug may be rotated for adjustment. $A^9$ is any suitable screen or filter secured to the plug. B is a tubular passage integral with the boss $A^2$ and terminating in the upwardly turned elbow $B^1$ at the end opposite the boss $A^2$. Adjacent the upper end of the elbow $B^1$ the walls of the passage are enlarged as at $B^2$ to provide space for the annular passage $B^3$, of circular cross section. Above such passage the elbow expands and terminates in the inwardly screw threaded rim $B^5$. Upwardly extending from the annular passage $B^3$ are a plurality of vents $B^6$.

Aligned with the central aperture of the tubular member B and screw threaded in the thickened end wall C of the passage $B^3$ is the air inlet nozzle $C^1$ provided with any suitable turn screw $C^2$ whereby it may be axially adjusted. The central aperture $C^3$ of the member $C^1$ is preferably aligned with the tip of the fuel jet $A^6$. $C^4$ is a compressed air passage in the wall C in connection, by means of the plug $C^5$, with any suitable pipe $C^6$ whereby compressed air may be supplied. $C^7$ is any suitable transverse passage whereby the passages $C^3$ and $C^4$ may be connected. The passage $C^4$ may be closed at its upper end, for example by the screw threaded plug $C^{10}$.

D is a branch pipe connected with the compressed air supply pipe $C^6$ and provided with any suitable valve $D^1$. It terminates in a jet or nozzle $D^2$ which may be axially aligned with the air passage $D^3$ which in turn communicates by the elbow $D^4$ with the annular passage $B^3$. The passage $D^3$ may be restricted as at $D^5$ to form a venturi adjacent and aligned with the nozzle $D^2$. $D^6$ is any suitable air inlet for the admission of atmospheric air. It will be understood that the jet $D^2$ is screw threaded as at $D^7$ to permit axial adjustment in relation to the securing member $D^8$ associated with the passage $D^3$.

E is an upright tubular member screw threaded as at $E^1$ to the flange $B^5$, the interior $E^2$ of which serves as combustion chamber.

G is an elbow passage connecting at one end, as at $G^1$, with the combustion chamber $E^2$, and at the other end, as at $G^2$, with the tube or passage B.

Access may be had to the fuel and air jets $A^6$ and $C^1$ by means of the screw cap $G^3$.

It will be understood that whereas I have illustrated a practical and operative device, that nevertheless many changes may be made in the size, shape, number and disposition of parts without departing from the spirit of my invention and that I wish my description and drawings to be taken as in a broad sense illustrative or diagrammatic rather than as limiting me to the specific process therein disclosed.

The use and operation of my invention are as follows:

Whereas my characteristic method of preparing hydrocarbon fuel for combustion, or of mixing a hydrocarbon fuel is susceptible of a number of applications, I have illustrated and described it in connection with a process and a device for mixing and burning the fuel in immediate succession, that is, of mixing the fuel for burning, and of immediately burning it, as fast as the combustible mixture is produced.

My process is particularly applicable to heating plants wherein a relatively heavy liquid hydrocarbon fuel is burned. In the mixing and burning of hydrocarbon fuels a number of difficulties arise. The noise of combustion is great and troublesome. When the hydrocarbon mixture is pre-heated for vaporization, partial precombustion, whether intended or not, causes noise. Also precombustion causes deposition of carbon in the burner and in the passages leading to the combustion zone. My process is free from these difficulties.

My process, as applied to the burning of a hydrocarbon mixture, progressively as mixed, includes the following main features. A liquid hydrocarbon is fed to the fuel delivery jet and is blown from the jet into the mixing passage B by compressed air delivered by a nozzle positioned at right angles to the fuel jet. When the structure herein shown is used the fuel nozzle is vertical and the compressed air nozzle is horizontal and aligned with the tip of the fuel nozzle. Whereas in practice I employ compressed air, it will be understood that I do not limit myself to this particular means of spraying the liquid hydrocarbon into the mixing zone and furthermore that the compressed air so supplied is employed to spray the liquid and not for the purpose of aiding combustion or of producing a combustible mixture. The effect of the compressed air is to project a jet of finely divided liquid hydrocarbon into the mixing zone or passage B. Assuming that the zone of combustion $E^2$ is already filled with a burning mixture the circulation of the hydrocarbon along the passage B to the zone of combustion, will suck some of the gases of combustion downwardly through the elbow G. The finely divided liquid fuel which is blown or sprayed by the jet of compressed air is mixed with these highly heated and inert gases, and the particles of fuel, divided into fine droplets by the compressed air, take up the heat of the current of exhaust gases so circulated, and are thereby vaporized. The proportion of oxygen in the waste gases and in the mixture so formed is insufficient to support combustion. Thus, although the hydrocarbon, already finely divided by the spraying of the compressed air jet, is vaporized by the heat of the waste gases and is raised to substantially the proper temperature for combustion, nevertheless precombustion is impossible until more oxygen is added to the mixture, and cracking of the fuel is avoided. The relatively highly heated incombustible mixture so formed passes forwardly to the combustion zone, and when it is mixed with air from the passage $B^3$ through the vents $B^6$ the mixture becomes combustible, and is burned, adjacent the mixing point.

It will be understood that a constant flow of air passes through the duct $D^3$ to the annular passage $B^3$, being induced for example by the jet of compressed air from the nozzle $D^2$ through the venturi $D^5$ which sucks in atmospheric air through the aperture $D^6$.

By employing the waste gases of consumption I am able to heat or vaporize the hydrocarbon before introducing it to the zone of combustion, while by the same gaseous heating vehicle, I substantially prevent precombustion, and cracking of the fuel before it is consumed. In effect I hold the hydrocarbon against combustion, during its vaporization, by vaporizing it through mixture with a heated, inert gaseous medium. Whereas I prefer to employ the waste gases of combustion as the inert heating medium, nevertheless I do not wish to limit myself to this specific application of my process. The process as herein described however has the advantage of employing waste gases and of employing them in a substantially continuous circulation or cycle.

Certain of the claims specify the spraying of the liquid hydrocarbon into a container. It will be understood that the word is not used in a restricted sense but is intended to cover any direction of the liquid hydrocarbon in finely divided form, the purpose being to supply the hydrocarbon for mixture in relatively small particles. Whereas in many of the claims I specify a method of continuously burning a liquid hydrocarbon, it will be realized that I do not wish the claims to be limited to literally constant combustion. My method of combustion may be interrupted and the apparatus may be intermittently operated without departing from the spirit of my invention and claims.

I claim:

1. The method of burning a hydrocarbon which consists in directing a non-combustible gaseous conveying jet into a mixing zone, delivering a liquid hydrocarbon to said jet, for atomization thereby, at a point adjacent the discharge of said jet, directing into said jet, subsequent to the mixing of the hydrocarbon therewith, the waste gases of combustion and thereby forming a substantially non-combustible mixture, and thereafter delivering to said non-combustible mixture sufficient air to support combustion, and burning off the combustible mixture so formed.

2. The method of burning a hydrocarbon which consists in directing a non-combustible gaseous conveying jet into a mixing zone, delivering a liquid hydrocarbon to said jet, for atomization thereby, at a point adjacent the discharge of the jet, directing into said jet, subsequent to the mixing of the hydrocarbon therewith, the heated waste gases of combustion and thereby forming a heated, substantially non-combustible mixture, and thereafter delivering to said heated, non-combustible mixture sufficient air to support combustion, and burning off the combustible mixture so formed.

3. The method of burning a hydrocarbon which consists in directing a non-combustible gaseous conveying jet into a mixing zone, delivering a liquid hydrocarbon to said jet, for atomization thereby, at a point adjacent the discharge of the jet, directing into said jet, subsequent to the mixing of the hydrocarbon therewith, the heated waste gases of combustion and thereby forming a heated, substantially non-combustible mixture, thereafter adding to said heated, non-combustible mixture a regulated, controlled quantity of air sufficient to support combustion, delivering the combustible mixture so formed to a closed zone of combustion, and there burning off the combustible mixture so formed, and returning, from said closed zone of combustion, a portion of the heated waste gases of combustion to the mixing zone, in continuous circuit.

4. The method of continuously burning a hydrocarbon which includes spraying a liquid hydrocarbon into a container, directing into said container, and mixing with said hydrocarbon, a hot, substantially inert gas, to form an imperfectly combustible mixture, subsequently mixing with said mixture a supply of air sufficient to support complete combustion, and burning the final mixture so formed.

5. The method of continuously burning a hydrocarbon which includes spraying a liquid hydrocarbon into a container, directing into said container, and mixing with said hydrocarbon, a return circuit of the waste gases of combustion, to form an imperfectly combustible mixture, subsequently mixing with said mixture a supply of air sufficient to support complete combustion, and burning the final mixture so formed.

6. The method of continuously burning a hydrocarbon which includes spraying a liquid hydrocarbon into a container, directing into said container, and mixing with said hydrocarbon, a hot, substantially inert gas, to form an imperfectly combustible mixture, subsequently mixing with said mixture a supply of air sufficient to support complete combustion, and burning the final mixture where formed.

7. The method of burning a hydrocarbon which includes spraying a jet of liquid hydrocarbon into a container, directing into said container, and mixing with said hydrocarbon, a hot, substantially inert gas, to form an imperfectly combustible mixture, subsequently mixing with said mixture a supply of air sufficient to support complete combustion, and burning the final mixture so formed.

8. The method of burning a hydrocarbon which includes spraying a jet of liquid hydrocarbon into a container, directing into said container, and mixing with said hydrocarbon, a return circuit of the waste gases of combustion, to form an imperfectly combustible mixture, subsequently mixing with said mixture a supply of air sufficient to support complete combustion, and burning the final mixture so formed.

9. The method of continuously burning a hydrocarbon which includes spraying a liquid hydrocarbon into a container, directing into said container, and mixing with said liquid hydrocarbon, waste gases of combustion, to form an imperfectly combustible mixture, subsequently mixing with said mixture a supply of air sufficient to support complete combustion, and burning the final mixture so formed.

10. The method of continuously burning a hydrocarbon which includes spraying a liquid hydrocarbon into a container, directing into said container, and mixing with said hydrocarbon, a return circuit of the waste gases of combustion, to form an imperfectly combustible mixture, subsequently mixing with said mixture a supply of air sufficient to support complete combustion, and burning the final mixture where formed.

11. The method of continuously burning a hydrocarbon which includes spraying a liquid hydrocarbon into a container, directing into said container, and mixing with said liquid hydrocarbon, waste gases of combustion, to form an imperfectly combustible mixture, subsequently mixing with said mixture a supply of air sufficient to support complete combustion, and burning the final mixture where formed.

In witness whereof I affix my signature.

JAMES L. BREESE, Jr.